United States Patent
Mueller et al.

(10) Patent No.: US 12,441,466 B2
(45) Date of Patent: Oct. 14, 2025

(54) SYSTEM FOR TESTING AIRCRAFT EMERGENCY LUBRICATION SYSTEM

(71) Applicant: Textron Innovations Inc., Providence, RI (US)

(72) Inventors: Douglas Robert Mueller, Coppell, TX (US); Jason DeWitt McPeak, Weatherford, TX (US); Mark Alan Przybyla, Keller, TX (US)

(73) Assignee: Textron Innovations Inc., Providence, RI (US)

( * ) Notice: Subject to any disclaimer, the term of this patent is extended or adjusted under 35 U.S.C. 154(b) by 120 days.

(21) Appl. No.: 18/049,181

(22) Filed: Oct. 24, 2022

(65) Prior Publication Data
US 2024/0132206 A1 Apr. 25, 2024
US 2024/0228030 A9 Jul. 11, 2024

(51) Int. Cl.
*F16H 57/04* (2010.01)
*B64C 29/00* (2006.01)
*B64F 5/60* (2017.01)
*B64D 35/00* (2006.01)

(52) U.S. Cl.
CPC ............ *B64C 29/0033* (2013.01); *B64F 5/60* (2017.01); *F16H 57/0442* (2013.01); *B64D 35/00* (2013.01)

(58) Field of Classification Search
CPC ............ F16H 57/0435; F16H 57/0442; F16H 57/0445; B64D 35/00; F16K 11/105; F16K 11/20; B64F 5/60
See application file for complete search history.

(56) References Cited

U.S. PATENT DOCUMENTS

| | | | | |
|---|---|---|---|---|
| 1,534,406 A | * | 4/1925 | Martocello | F25C 1/18 137/544 |
| 3,166,098 A | * | 1/1965 | Jennings | F16K 11/0873 251/367 |
| 4,489,721 A | * | 12/1984 | Ozaki | A61M 16/0463 128/205.24 |
| 5,334,182 A | * | 8/1994 | Simons | A61M 39/10 604/32 |
| 6,347,644 B1 | * | 2/2002 | Channell | F16K 11/20 137/625.29 |
| 7,854,793 B2 | * | 12/2010 | Rarig | B01D 53/0446 96/124 |
| 9,683,677 B2 | * | 6/2017 | Pettinaroli | F16K 31/60 |
| 10,190,672 B2 | * | 1/2019 | Ehinger | B64D 35/00 |
| 2008/0000353 A1 | * | 1/2008 | Rarig | F16K 11/085 96/124 |

* cited by examiner

*Primary Examiner* — Minh Truong
(74) *Attorney, Agent, or Firm* — Akona IP PC

(57) ABSTRACT

A drive system for a rotorcraft includes first and second gearbox assemblies and a lubrication assembly. The lubrication assembly includes first and second lubrication systems and a valve connected between the first and second lubrication systems such that when the valve is in a first position, a test mode of operation of the lubrication assembly is enabled and when the valve is in a second position, a normal mode of operation of the lubrication assembly is enabled. The lubrication assembly also includes a valve control unit operable to instruct the valve to selectively move between the first position and the second position.

15 Claims, 11 Drawing Sheets

SYSTEM FOR TESTING AIRCRAFT EMERGENCY LUBRICATION SYSTEM

STATEMENT REGARDING FEDERALLY SPONSORED RESEARCH OR DEVELOPMENT

This invention was made with U.S. Government support under Agreement No. W9124P-19-9-0001 awarded by the Army Contracting Command-Redstone Arsenal to the AMTC and a related AMTC Project Agreement 19-08-006 with Bell Textron Inc. The Government has certain rights in the invention.

TECHNICAL FIELD

This disclosure relates in general to the field of aircraft and, more particularly, though not exclusively, to a system for testing operation of an aircraft emergency lubrication system (ELS).

BACKGROUND

Rotorcraft drive systems can include various components that produce and transfer power. For example, engines and gearboxes are standard components. Such components generate heat and require lubrication. Excessive levels of heat can cause premature failure and create safety risks. Proper lubrication serves to reduce heat generation and assist in heat removal from moving components within gearboxes.

Typically, rotorcraft use a variety of primary lubrication systems to provide wear protection and heat transfer for moving components. Under normal operating conditions, primary lubrication systems provide proper lubrication and heat removal. However, primary lubrication systems can fail and result in excessive heat generation, wear, and failure of components, such as bearings or gears within a gearbox.

Rotorcraft are generally required to maintain manageable flight operations for selected durations of time if the primary lubrication system fails. One method used to satisfy the requirements of manageable flight during a lubrication system failure is to use a secondary, emergency lubrication system to operate when the primary lubrication system fails. This method increases the overall weight of the rotorcraft. Therefore, an improved method of controlling heat transfer from an aircraft gearbox is desired.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

Figure 1:
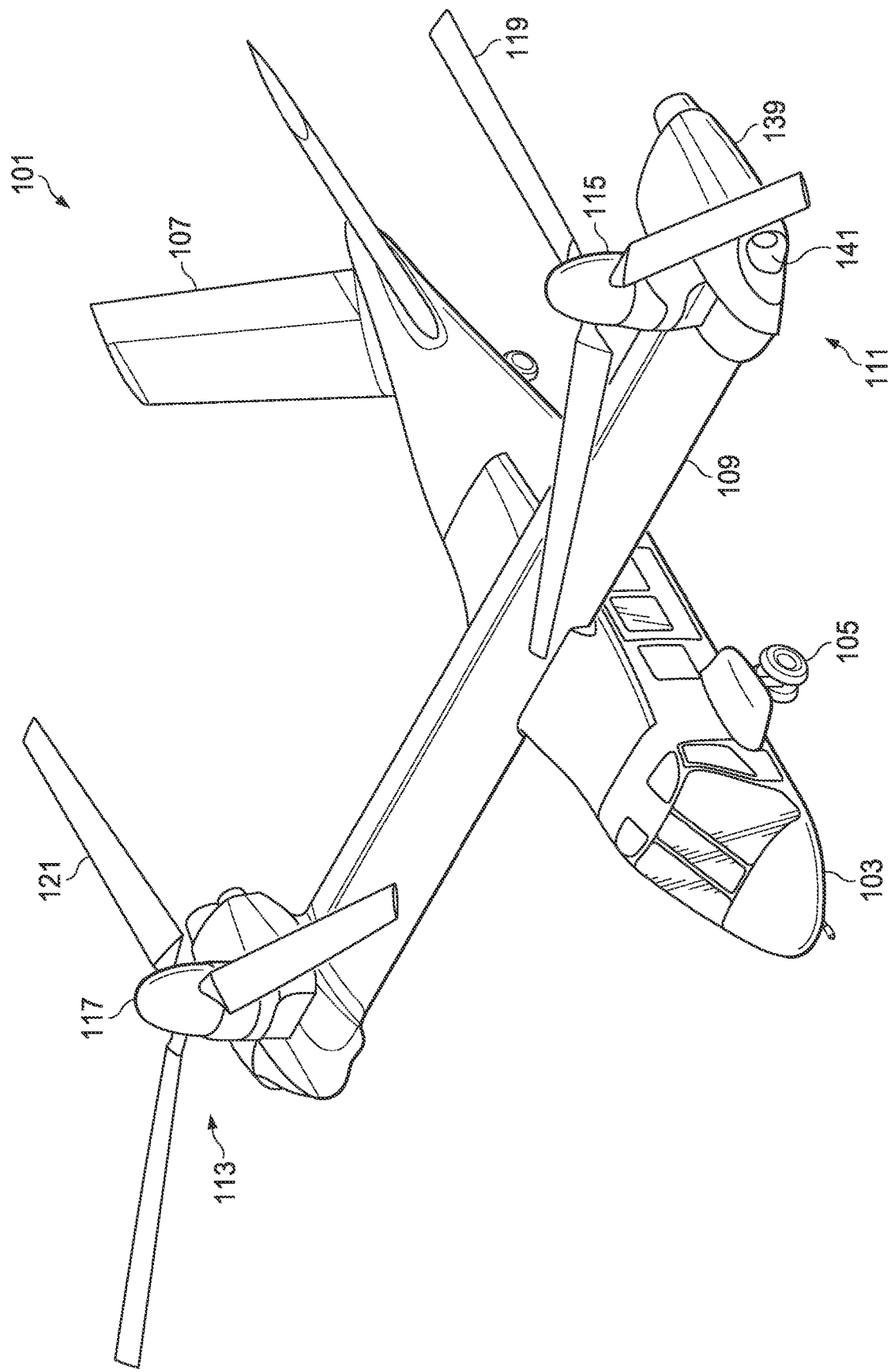
FIG. 1 illustrates a perspective view of a tiltrotor aircraft in helicopter mode, according to one example embodiment.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Additionally, as referred to herein in this Specification, the terms "forward", "aft", "inboard", and "outboard" may be used to describe relative relationship(s) between components and/or spatial orientation of aspect(s) of a component or components. The term "forward" may refer to a spatial direction that is closer to a front of an aircraft relative to another component or component aspect(s). The term "aft" may refer to a spatial direction that is closer to a rear of an aircraft relative to another component or component aspect(s). The term "inboard" may refer to a location of a component that is within the fuselage of an aircraft and/or a spatial direction that is closer to or along a centerline of the aircraft (wherein the centerline runs between the front and the rear of the aircraft) or other point of reference relative to another component or component aspect. The term "outboard" may refer to a location of a component that is outside the fuselage of an aircraft and/or a spatial direction that farther from the centerline of the aircraft or other point of reference relative to another component or component aspect.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Figure 2:
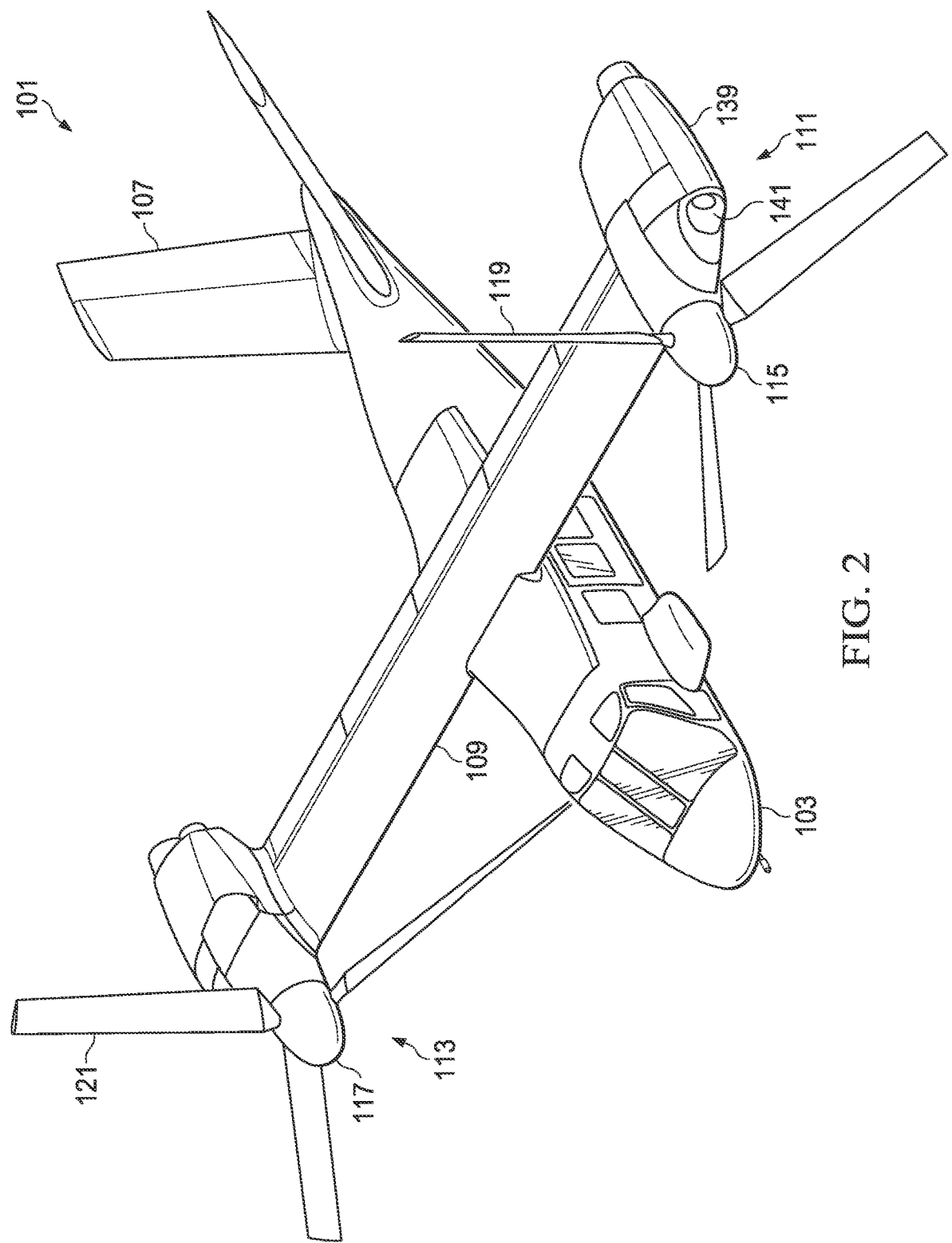
FIG. 2 illustrates a perspective view of a tiltrotor aircraft in airplane mode, according to one example embodiment.

FIGS. 1 and 2 in the drawings illustrate a tiltrotor aircraft 101, according to one example embodiment. Tiltrotor aircraft 101 can include a fuselage 103, a landing gear 105, a tail member 107, a wing 109, a drive system 111, and a drive system 113. Each drive system 111 and 113 includes a fixed engine 139 and a rotatable proprotor 115 and 117, respectively. Each rotatable proprotor 115 and 117 have a plurality of rotor blades 119 and 121, respectively, associated therewith. The position of proprotors 115 and 117, as well as the pitch of rotor blades 119 and 121, can be selectively controlled in order to selectively control direction, thrust, and lift of tiltrotor aircraft 101.

FIG. 1 illustrates tiltrotor aircraft 101 in helicopter mode, in which proprotors 115 and 117 are positioned substantially vertical to provide a lifting thrust. FIG. 2 illustrates tiltrotor aircraft 101 in an airplane mode in which proprotors 115 and 117 are positioned substantially horizontal to provide a forward thrust in which a lifting force is supplied by wing 109. It should be appreciated that tiltrotor aircraft can be operated such that proprotors 115 and 117 are selectively positioned between airplane mode and helicopter mode, which can be referred to as a conversion mode.

The drive system 113 is substantially symmetric to the drive system 111; therefore, for sake of efficiency, certain features will be disclosed only with regard to drive system 111. However, one of ordinary skill in the art would fully appreciate an understanding of drive system 113 based upon the disclosure herein of drive system 111.

Further, drive systems 111 and 113 are illustrated in the context of tiltrotor aircraft 101; however, drive systems 111 and 113 can be implemented on other tiltrotor aircraft. For example, an alternative embodiment may include a quad tiltrotor that has an additional wing member aft of wing 109; the additional wing member can have additional drive systems similar to drive systems 111 and 113. In another embodiment, drive systems 111 and 113 can be used with an unmanned version of tiltrotor aircraft 101. Further, drive systems 111 and 113 can be integrated into a variety of aircraft configurations. Additionally, other drive systems are contemplated. For example, one example is a gearbox arrangement to provide torque to a rotor system of a helicopter.

Figure 3:
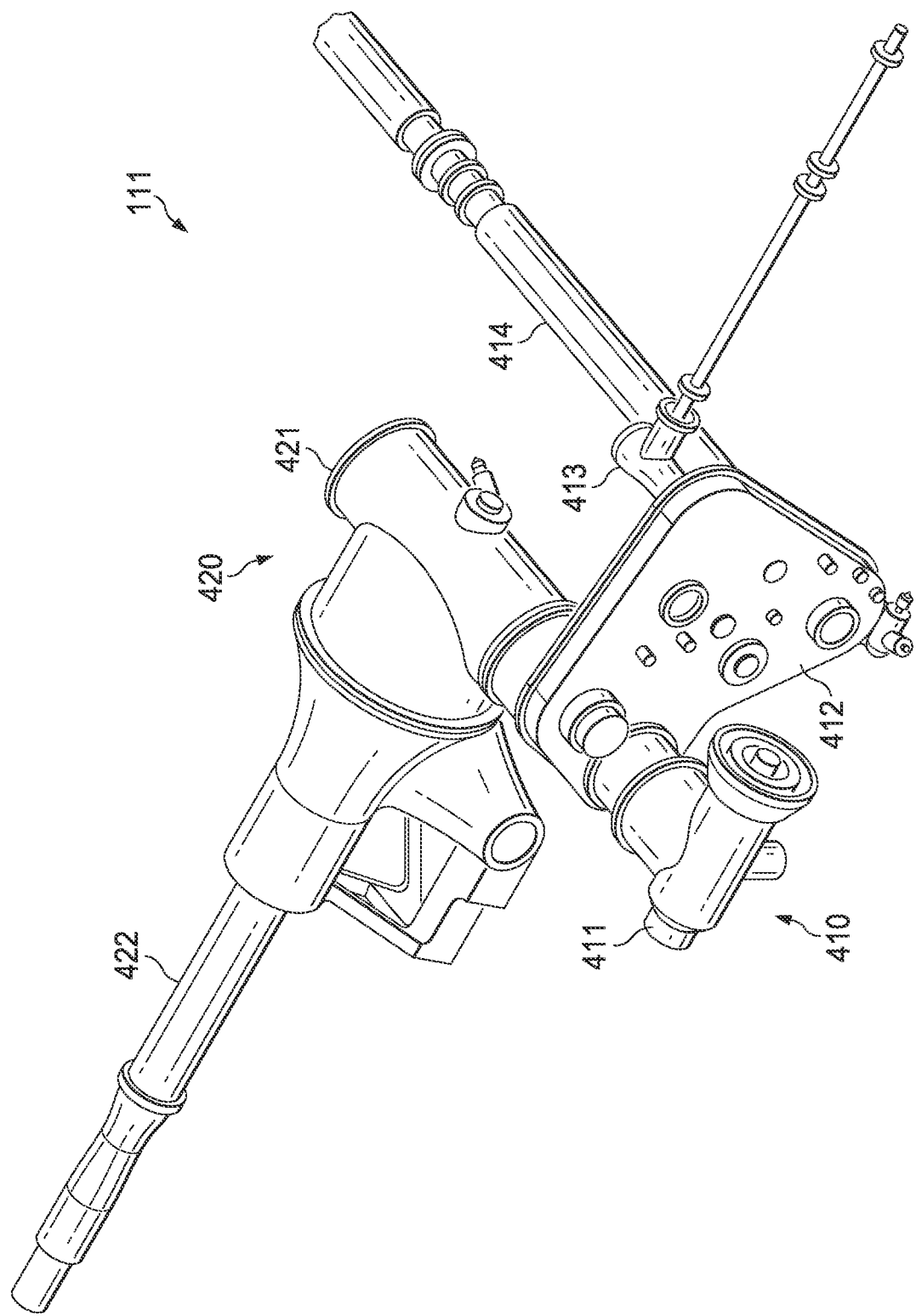
FIG. 3 illustrates a perspective view of the drive system of the tiltrotor aircraft of FIGS. 1 and 2, according to one example embodiment.

FIG. 3 shows a perspective view of drive system 111, according to one example embodiment. Drive system 111 may include a first gearbox assembly 410 and a second gearbox assembly 420. First gearbox assembly 410 may include a spiral bevel gearbox 411, an interconnect gearbox 412, a blower gearbox 413, an interconnect driveshaft 414, and an engine 139 (not shown in FIG. 3). Second gearbox assembly 420 may include a proprotor gearbox 421, and mast 422.

Engine 139 may be fixed relative to wing 109 of aircraft 101 and can provide torque via an engine output shaft (not shown) to spiral bevel gearbox 411. Spiral bevel gearbox 411 can include spiral bevel gears to change torque direction by approximately ninety degrees from engine 139 to interconnect gearbox 412 via a clutch. Interconnect gearbox 412 can include a plurality of gears, such as helical gears, in a gear train that are coupled to interconnect driveshaft 414, blower gearbox 413, and second gearbox assembly 420. The interconnect gearbox 412 can also be configured to provide power to various system accessories such as alternators, lube and scavenge pumps, hydraulic pumps, and generators.

Proprotor gearbox 421 can include a plurality of gears that can be configured to transfer power and reduce rotational speed to mast 422. The blower gearbox 413 can be mounted to interconnect gearbox 412 and can be configured to provide torque to the oil cooler blower fan, which may be used to draw in air for lubricant temperature reduction. Interconnect driveshaft 414 can be configured to provide a torque path that enables a single engine to provide torque to both drive systems 111 and 113 in the event of a failure of one of the engines.

Gears, bearings, and other mechanical components of drive system 111 are subject to wear and heat generation due to contact with other components. These mechanical components may be lubricated to reduce friction and transfer heat away from the components. Lubrication is the process or technique employed to reduce wear of one or both surfaces in close proximity, and moving relative to each other, by interposing a substance, such as a lubricant, between the surfaces to help carry the load (pressure generated) between the opposing surfaces.

A lubricant is a substance introduced to reduce friction between moving surfaces. Examples of lubricants can include oil, biolubricants derived from plants and animals, synthetic oils, solid lubricants, and aqueous lubricants. Example transmission oils for gearbox 160 may include oils meeting specifications MIL-PRF-23699 (5cSt), DOD-L-7808 (3-4cSt), DOD-PRF-85734 (5cSt), and other oils in the 9cSt to 10cSt viscosity range. Drive system 111 may include one or more lubrication systems to provide lubricant to the mechanical components of drive system 111.

Figure 4:
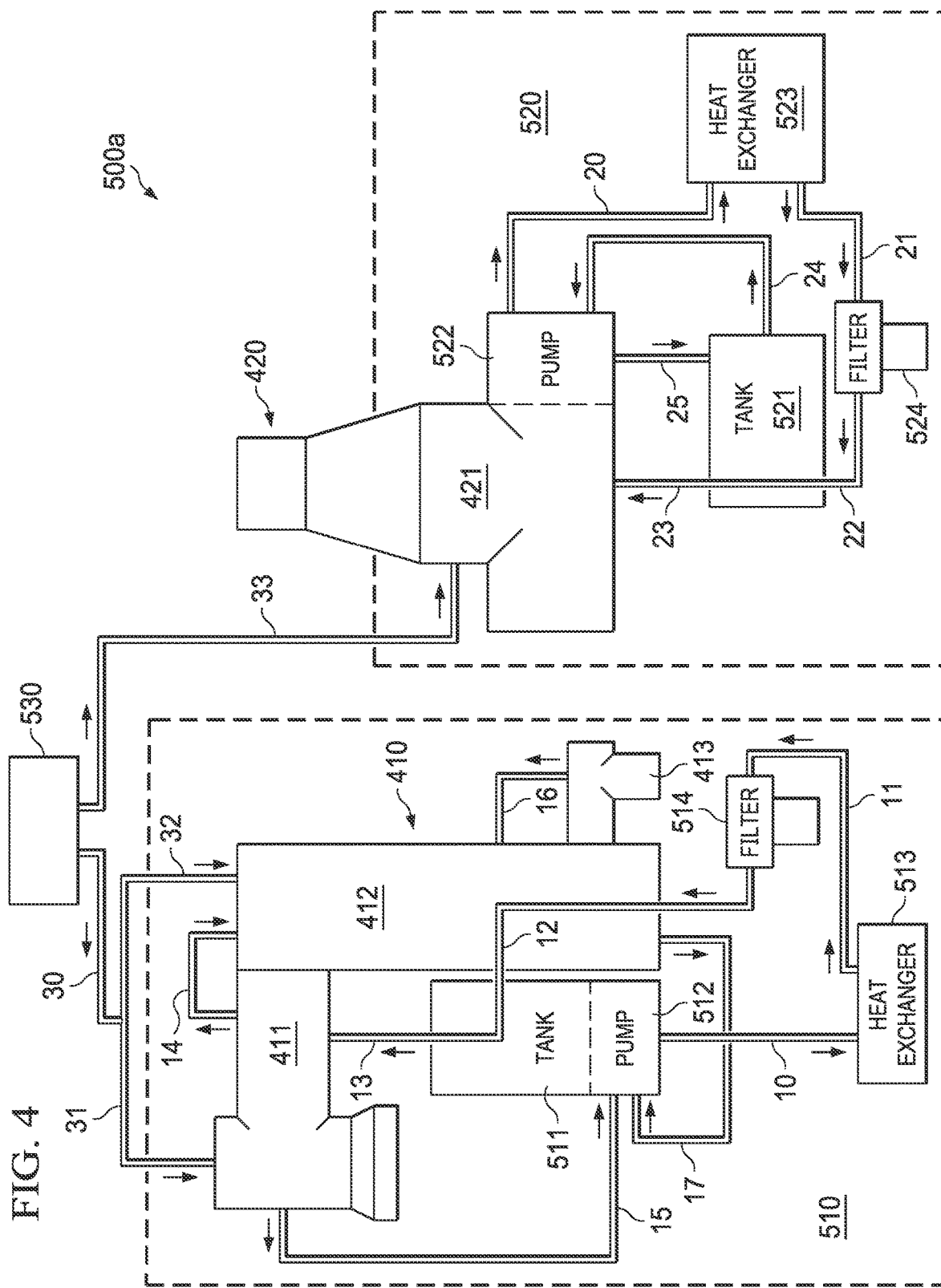
FIG. 4 illustrates a schematic view of a lubrication arrangement of the drive system of FIG. 3, according to one example embodiment.

FIG. 4 shows a schematic view of a lubrication arrangement 500a of drive system 111, according to one example. Lubrication arrangement 500a can include a first lubrication system 510 and a second lubrication system 520. Lubrication system 510 may provide lubricant to components of first gearbox assembly 410, whereas lubrication system 520 may provide lubricant to components of second gearbox assembly 420. Lubrication system 510 can include lubricant tank 511, pump 512, heat exchanger 513, filter 514, and lubrication lines 10 through 17. Lubrication system 520 may include lubricant tank 521, pump 522, heat exchanger 523, filter 524, and lubrication lines 20 through 25. Lubrication systems 510 and 520 may also include other components such as one or more sensors 810, pressure regulators, flowmeters, check valves, and jets, which are not depicted in the schematic view of FIGS. 4 and 5.

Tanks 511 and 521 may represent reservoirs that store lubricant within lubrication systems 510 and 520, respectively. Tanks 511 and 521 may be integral with the housing of one of the gearboxes, such as interconnect gearbox 412 or proprotor gearbox 421, or separate from the housings of the gearboxes. Pumps 512 and 522 may represent devices that can be configured to circulate pressurized lubricant throughout lubrication systems 510 and 520, respectively. Heat exchangers 513 and 523 may be devices configured to lower the temperature of the lubricant before the lubricant is applied to the various components that generate heat. Filters 514 and 524 may represent devices configured to remove contaminants from the lubricant. Jets, which are not shown in the schematic views of FIGS. 4 and 5, may be devices configured to dispense lubricant on components of drive system 111 that are subject to friction and/or generate heat, such as gears and bearing.

Figure 5:
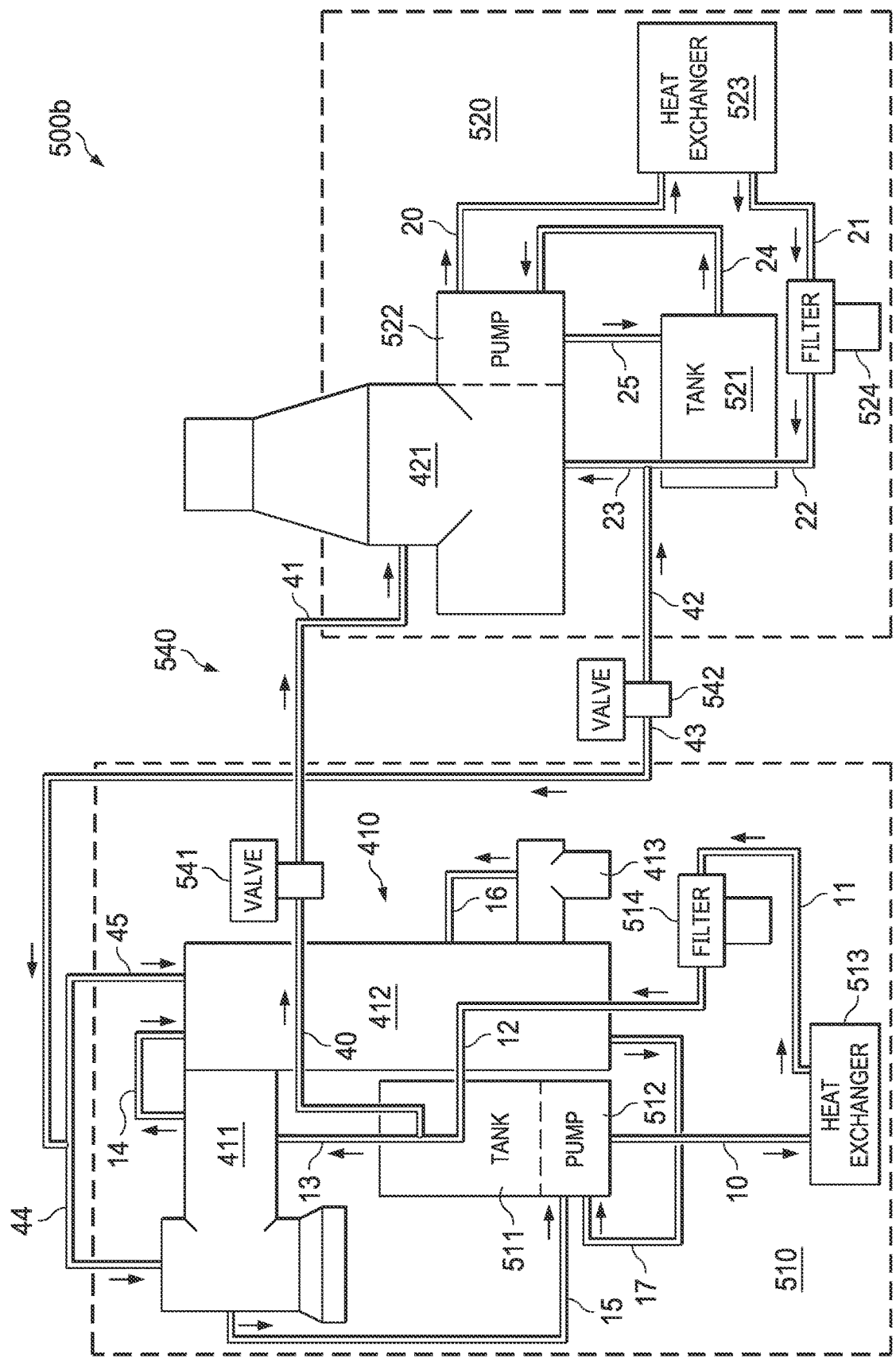
FIG. 5 illustrates a schematic view of a lubrication arrangement of the drive system of FIG. 3, according to one example embodiment.

Sensors 810, which are not shown in the schematic view of FIGS. 4 and 5, may represent devices that can be configured to detect one or more rotorcraft parameters output by rotorcraft 101. For example, lubrication arrangement 500a may include one or more pressure sensors 810 that can detect the pressure of the lubricant within lubrication system 510 or 520. Examples of pressure sensors may include strain-gauge sensors, capacitive sensors, electromagnetic sensors, piezoelectric sensors, optical sensors, potentiometric sensors, resonant sensors, and thermal sensors, to name a few. In another example embodiment, lubrication arrangement 500a may include one or more temperature sensors that can detect the temperature of the lubricant in lubrication system 510 or 520. It should be noted that rotorcraft 101, drive system 111, or lubrication arrangement 500a may include a plurality of sensors that are of different types. For example, lubrication arrangement 500a can include both a pressure sensor and a temperature sensor.

Lubrication lines 10 through 17 and 20 through 25 may represent fluid lines that connect various components of lubrication system 510 and 520. Lubrication lines 10 through 17 and 20 through 25 may represent rigid pipelines, such as core passages in the housing of a gearbox, or flexible hoses, such as fluoropolymer tubing. The type of lubrication lines used may depend on the location of the line or expected fluid pressure within the line. Lubrication lines 10 through 17 and 20 through 25 may include other components such as swivels and quick disconnect couplings. In some examples, lubrication lines 10 through 17 and 20 through 25 may be collapsible in order to reduce residual lubricant during storage and when lubricant is not being flowed through the line.

As mentioned, lubrication lines 10 through 17 and 20 through 25 may fluidly connect various components of lubrication system 510 or 520. Lubrication lines 10 through 17 may fluidly connect components of lubrication system 510. For example, as can be seen in FIGS. 4 and 5, pump 512 may deliver lubricant from tank 511 into lubrication line 10. The lubricant may then travel from lubrication line 10 to heat exchanger 513 where the lubricant is cooled. Next, the lubricant may travel from heat exchanger 513, through line 11, to filter 514 where particles may be removed from the lubricant. From filter 514, the lubricant may travel through line 12 to one or more gearboxes within lubrication system 510, such that the lubricant gets delivered to moving components within the one or more gearboxes. The lubricant then, after traveling through lines 13 through 17, returns to tank 511.

Lubrication lines 20 through 25 may fluidly connect components of lubrication system 520. For example, pump 522 may deliver lubricant from tank 521 to lubricant line 20, from line 20 to heat exchanger 523 where the lubricant is cooled. From heat exchanger 523, the lubricant may then be delivered to filter 524, via line 21, where particles may be removed from the lubricant. From filter 524, the lubricant may travel through line 22 to oil tank 521.

Under normal operating conditions, lubrication systems 510 and 520 provide proper lubrication to the moving components of first gearbox assembly 410 and second gearbox assembly 420, respectively. The lubricant pressure within the gearboxes of first gearbox assembly 410 and second gearbox assembly 420 may be at a normal level, for example, fifty PSI (pounds per square inch). Additionally, during normal operating conditions, first lubrication system 510 may not be in fluid communication with second lubrication system 520.

If for example, proper lubrication is not provided to the moving components of gearbox assemblies 410 or 420 or lubrication system 510 or 520 experience a loss of lubrication, the moving components of gearbox assembly 410 or 420 may experience excessive wear or the failure of components. One example cause of a loss of lubrication may be a leak between the casing of one of the gearboxes and one of its components. In some loss of lubrication circumstances, the lubricant pressure within a gearbox of gearbox assembly 410 or 420 may be reduced to an undesired level. For example, the pressure may drop below thirty PSI, and in some instances may drop to zero PSI.

Rotorcraft are generally required to maintain manageable flight operations for selected durations of time if the rotorcraft experiences low lubricant pressure, such as during a loss of lubrication situation or lubrication system failure. For example, an aviation agency may require that the loss of lubrication will not prevent continued safe operation for at least thirty minutes after perception by the flight crew of the lubrication system failure or loss of lubrication. Therefore, some rotorcraft may also include a secondary lubrication system, such as emergency lubrication system 530.

Emergency lubrication system 530 may represent a system that has a secondary lubricant tank and a pressurizing device. The lubricant tank of emergency lubrication system 530 may represent a reservoir configured to contain lubricant. In one example, the lubricant tank of emergency lubrication system 530 may be configured to contain approximately seven gallons of lubricant. Examples of a pressurizing device that can be used in emergency lubrication system 530 may be a mechanically driven pump, a hydraulically driven pump, an electrically driven pump, or a gravity feed system.

In a loss of lubrication event, lubricant may be introduced from the emergency lubrication system 530 to the working components of gearbox assembly 410 and/or 420. Lubricant may be provided from the secondary lubrication tank of emergency lubrication system 530 to gearbox assembly 410 through lubrication lines 30 through 32 and emergency line jets (not shown), and/or to gearbox assembly 420 through lubrication lines 33 and emergency line jets (not shown).

Even though the use of emergency lubrication system 530 has some advantages, such as increasing the amount of time the rotorcraft is operable, this method may have some potential disadvantages, such as increasing the weight of the aircraft due to the extra tank, pump, and lubricant that may be included in emergency lubrication system 530. Therefore, a new system and method for providing emergency lubrication is needed.

FIG. 5 shows a schematic view of a lubrication arrangement 500b, according to one example embodiment. Lubrication arrangement 500b features emergency lubrication system 540. Emergency lubrication system 540 can include emergency lubrication lines 40 through 45, valves 541 and 542, and one or more emergency jets (not shown).

Emergency lubrication lines 40 through 45 may represent rigid pipelines, such as core passages in the housing of a gearbox, or flexible hoses, such as fluoropolymer tubing. The type of lubrication lines used may depend on the location of the line or expected fluid pressure within the line. Lubrication lines 40 through 45 may include other components such as swivels and quick disconnect couplings.

Lubrication lines 40 through 45 can be configured such that they deliver lubricant to emergency jets (not shown).

Valves 541 and 542 can represent devices that regulate the flow of a fluid by opening or closing a passageway. In one example, valve 541 and/or 542 can be a solenoid valve that can be electromechanically operated. An electric current may control the solenoid valve, and the valve can be switched open to allow a flow of lubricant or closed to stop a flow of lubricant.

In one example embodiment, emergency lubrication system 540 does not include an extra lubrication tank that provides lubricant to gearbox assembly 410 and/or gearbox assembly 420. However, extra lubricant can be stored within tank 511 and/or tank 521. For example, two extra gallons may be stored within tank 511, and seven extra gallons may be stored within tank 521.

During a loss of lubrication event in one of the gearbox assemblies, a lubrication system that under normal operating conditions supplies lubricant to another gearbox assembly may also supply lubricant to the gearbox assembly that is experiencing a loss of lubrication event. For example, if second gearbox assembly 420 experiences a loss of lubrication event, lubricant can be supplied to second gearbox assembly 420 by lubrication system 510 by opening valve 541.

Lubricant may flow from lubrication system 510 to lubricant line 40, from line 40 to valve 541, from valve 541 to line 41, from line 41 to gearbox assembly 420. The flow of lubricant can be caused by the pressure of lubricant in lubrication system 510 that is created by pump 512 of lubrication system 510. In one example, emergency jets can be used to supply the lubricant from lubrication system 510 to gearbox assembly 420. The emergency jets may allow for a slower flow rate of lubricant than the normal operating jets in order to conserve lubricant.

If gearbox assembly 410 experiences loss of lubrication, valve 542 can be opened to allow a flow of lubricant from lubrication system 520 to gearbox assembly 410. Lubricant may flow from lubrication system 520 to lubrication line 42, from line 42 to valve 542, from valve 542 to line 43, from line 43 to lines 44 and 45, from lines 44 and 45 to gearbox assembly 410. The flow of lubricant can be caused by the pressure of lubricant in lubrication system 520 that is created by pump 522 of lubrication system 520. In one example, emergency jets can be used to supply the lubricant from lubrication system 510 to gearbox assembly 410. The emergency jets may allow for a slower flow rate of lubricant than the normal operating jets in order to conserve lubricant.

Figure 6:
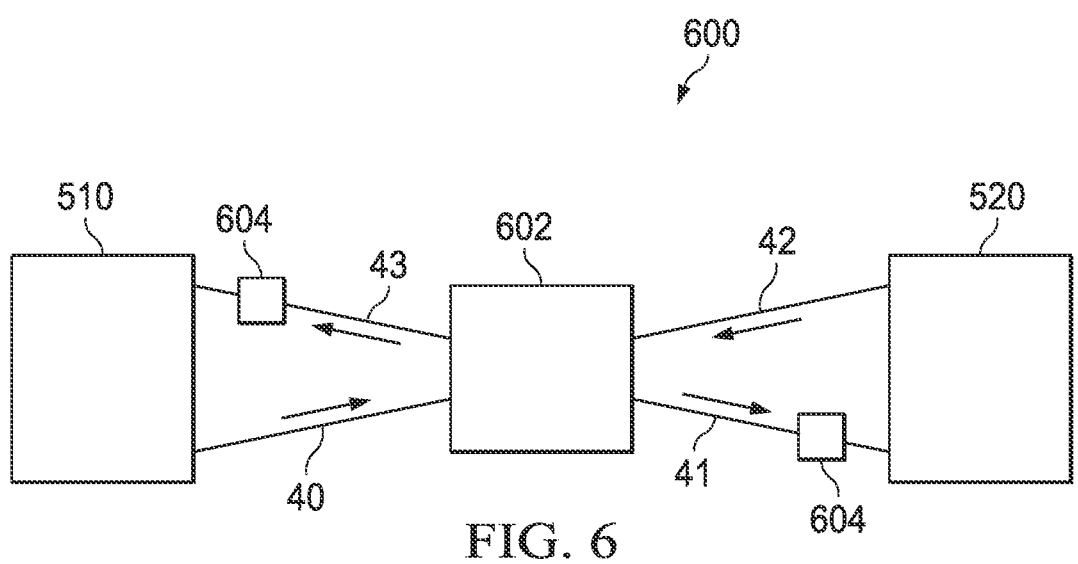
FIG. 6 illustrates a representative block diagram of a lubrication arrangement of the drive system of FIG. 3, according to one example embodiment.

There has more recently arisen a need to functionally test the emergency lubrication system of an aircraft more regularly (e.g., daily) to allow for identification and mitigation of ruptures or leaks in the lubricant lines and associated fittings sufficiently early so as to not interrupt flight schedules (or to interrupt such schedules where necessary). FIG. 6 illustrates a simplified block diagram of a lubrication arrangement 600, according to one example embodiment for enabling functional testing of the emergency lubrication system without requiring oil transfer between the lubrication systems, as is currently required when testing emergency lubrication systems having more conventional arrangements such as described above. The arrangement 600 also eliminates the need for maintainers to visually verify oil was transferred, as well as the need for maintenance actions to be performed after functional checks. As a result, the arrangement 600 enables more convenient and fast testing of the emergency lubrication system.

The lubrication arrangement 600 may be similar in all relevant respects to lubrication arrangement 500b except that valves 541, 542, are replaced by a single four-position valve 602. Additionally, lubricant lines 41, 43, are provided with pressure sensors, or pressure transducers, 604 for purposes to be described in greater detail below.

Figure 7A:
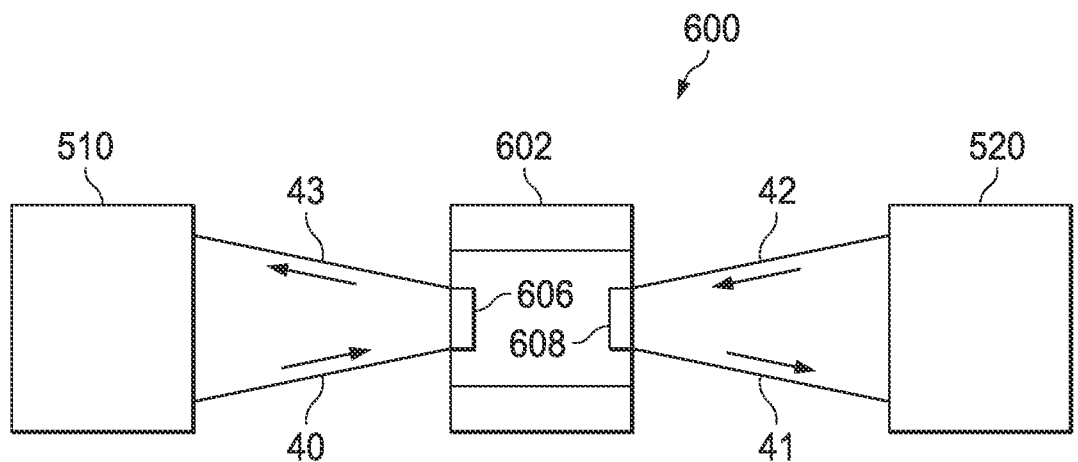
FIGS. 7A-7D illustrate various possible configurations of the four position valve of the lubrication arrangement of FIG. 6, according to one example embodiment.

Referring now to FIG. 7A, in accordance with features of embodiments described herein, use of a four-position valve, such as the valve 602, enables the arrangement 600 to be put into a "test" mode in which functional checks may be performed on the system without the need to transfer lubricant between the lubrication systems 510, 520 and corresponding gear box assemblies 410, 420. This also eliminates the need for maintenance actions required after performing functional checks when lubricant is transferred between lubrication systems. As shown in FIG. 7A, when the valve 602 is in the test mode position, lubricant flows (e.g., is pumped) from lubrication system 510 to lubricant line 40, from lubricant line 40 to a passageway 606 in valve 602, from passageway 606 to lubricant line 43, and from lubricant line 43 back to lubrication system 510. Similarly, lubricant flows (e.g., is pumped) from lubrication system 520 to lubricant line 42, from lubricant line 42 to a passageway 608 in valve 602, from passageway 608 to lubricant line 41, and from lubricant line 41 back to lubrication system 520. Pressure transducers 604 on lubricant lines 41 and 43, as shown in FIG. 6, generate data indicative of a pressure in the respective lubrication systems to enable detection of problems in the system that would result in low pressure in the lines. In this manner, functional checks may be performed on each lubrication system 510, 520 individually but simultaneously, with the results being detected as described in greater detail below with reference to FIG. 8.

Figure 7B:
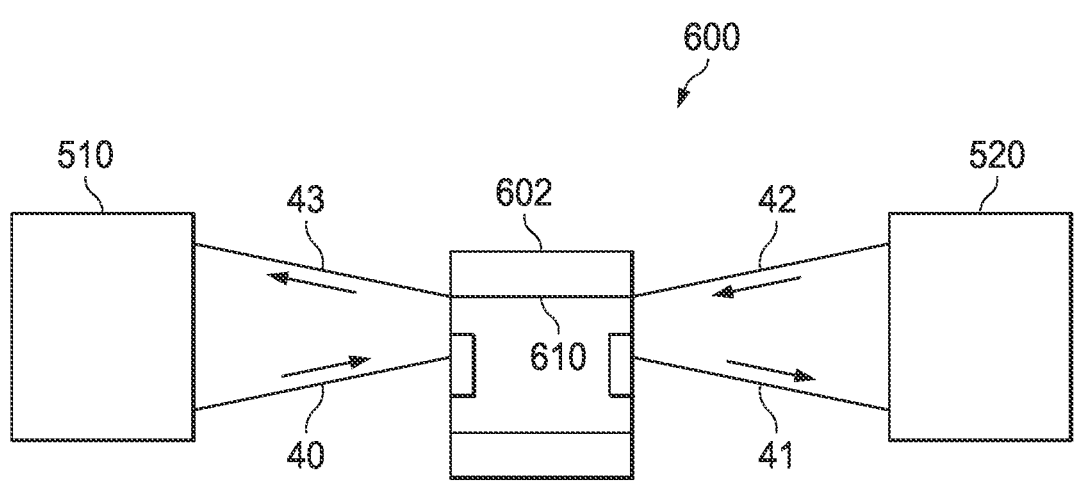

FIG. 7B illustrates a position of the valve 602 responsive to a loss of lubrication event in connection with gearbox 410 of lubrication system 510. In this position, lubricant flows from lubrication system 520 to lubricant line 42, from lubricant line 42 to a passageway 610 in valve 602, from passageway 610 to lubricant line 43, and from lubricant line 43 to lubrication system 510.

Figure 7C:
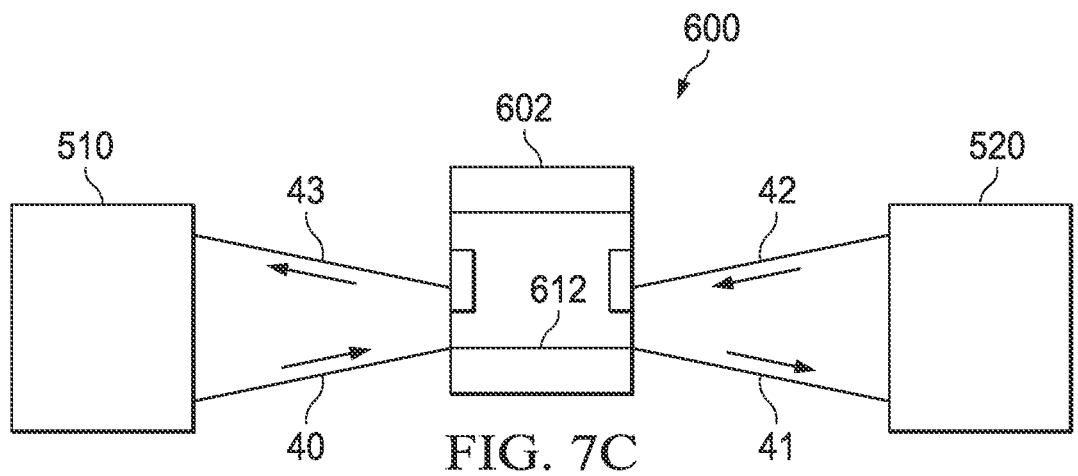

FIG. 7C illustrates a position of the valve 602 responsive to a loss of lubrication event in connection with gearbox 420 of lubrication system 520. In this position, lubricant flows from lubrication system 510 to lubricant line 40, from lubricant line 40 to a passageway 612 in valve 602, from passageway 612 to lubricant line 41, and from lubricant line 41 to lubrication system 520.

Figure 7D:
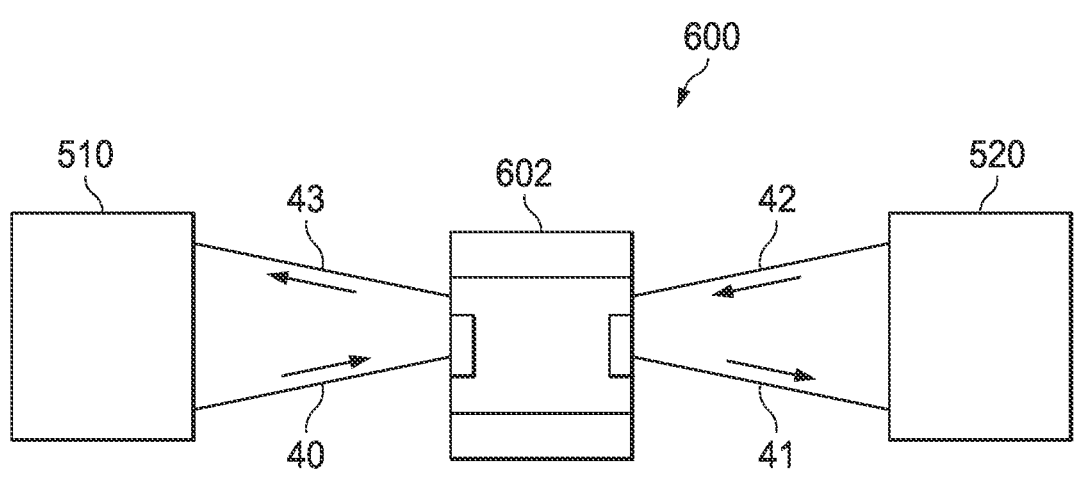

Finally, FIG. 7D illustrates a position of the valve 602 during a normal mode of operation, in which no lubricant flows through any passageway 606-612 of valve 602.

The flow of lubricant can be caused by the pressure of lubricant in lubrication system 510 that is created by pump 512 of lubrication system 510. In one example, emergency jets can be used to supply the lubricant from lubrication system 510 to gearbox assembly 410. The emergency jets may allow for a slower flow rate of lubricant than the normal operating jets in order to conserve lubricant. Similarly, the flow of lubricant can be caused by the pressure of lubricant in lubrication system 520 that is created by pump 522 of lubrication system 520. In one example, emergency jets can be used to supply the lubricant from lubrication system 520 to gearbox assembly 420. The emergency jets may allow for a slower flow rate of lubricant than the normal operating jets in order to conserve lubricant.

Figure 7E:
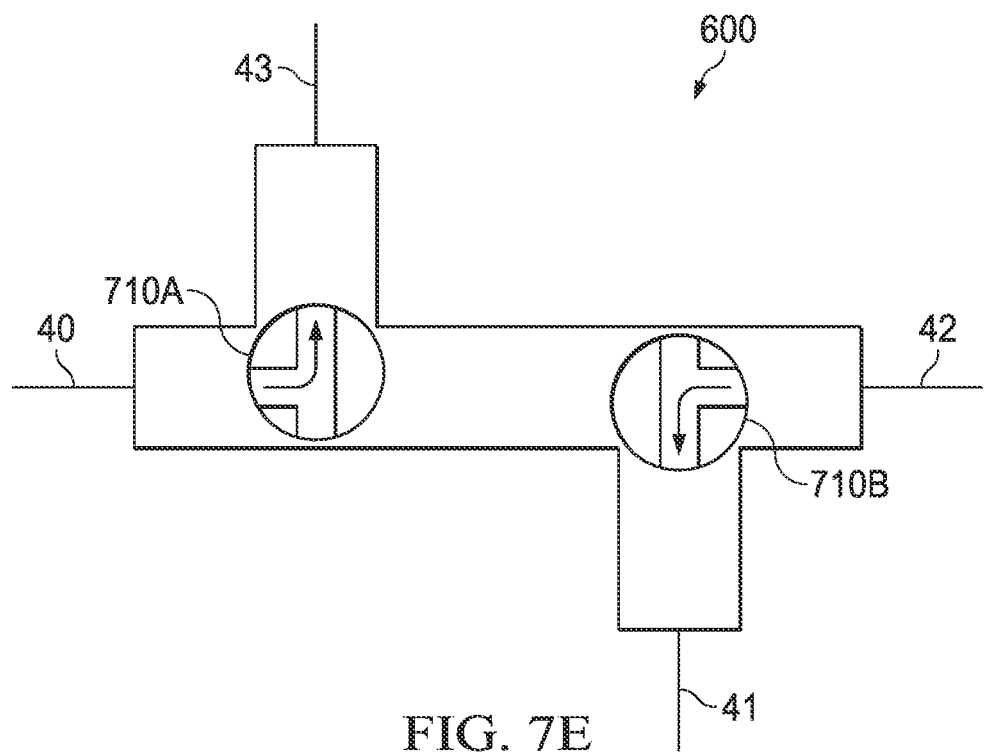
FIGS. 7E-7H illustrate various possible configurations of a pair of ball valves comprising the four position valve of the lubrication arrangement of FIG. 6, according to one example embodiment.
Figure 7F:
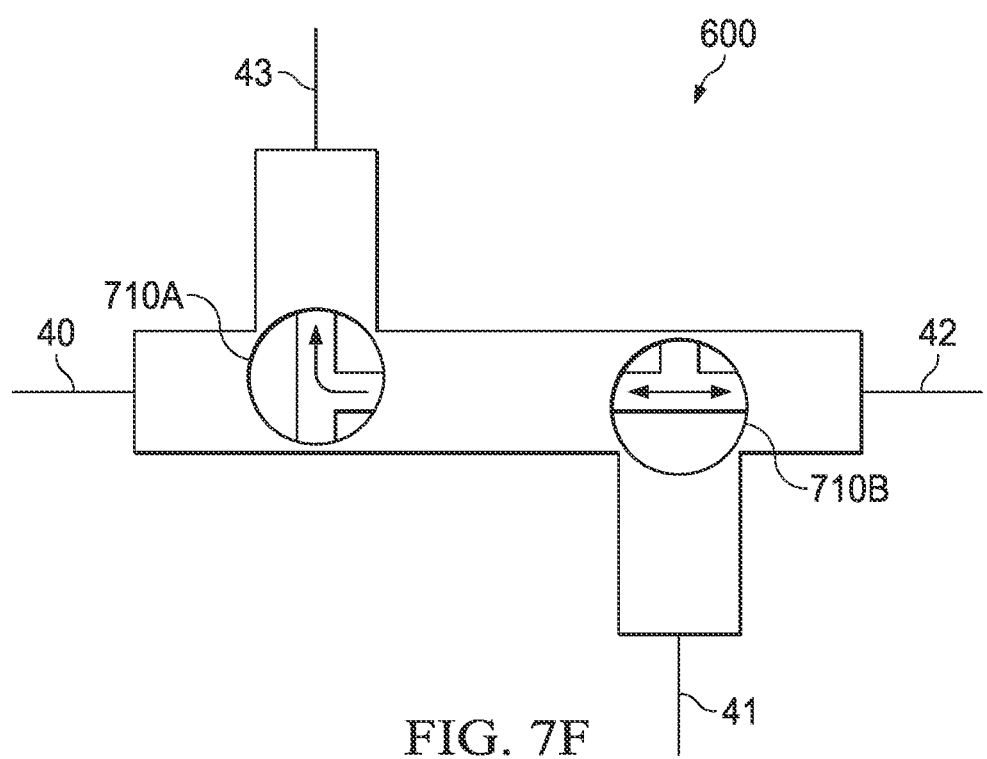
Figure 7G:
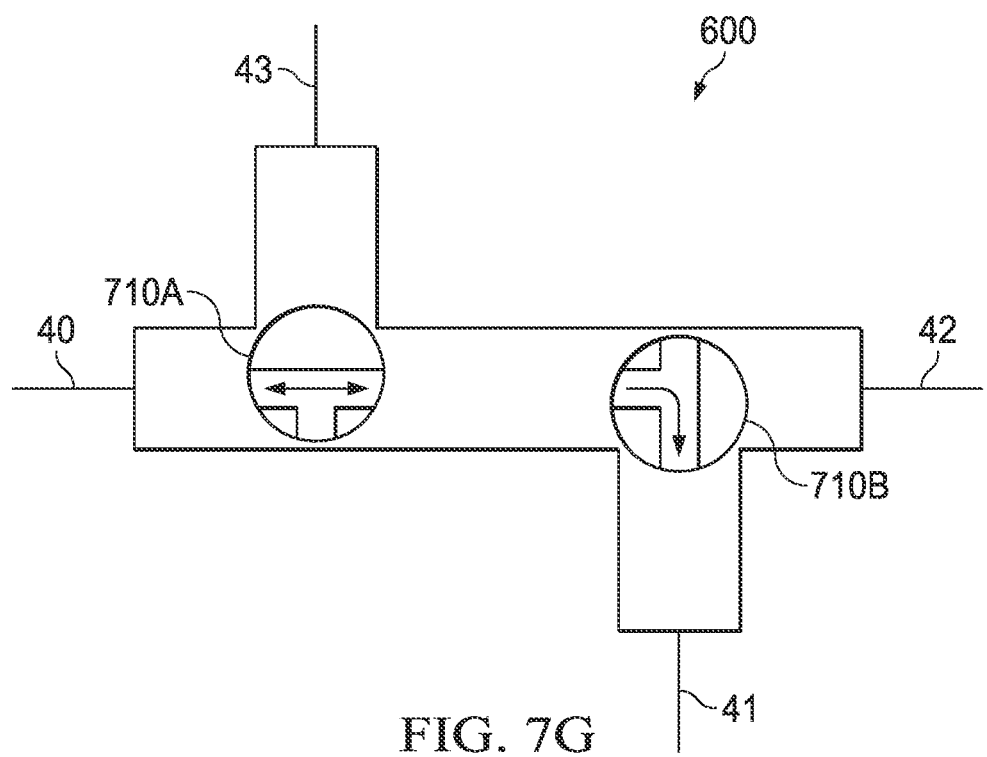
Figure 7H:
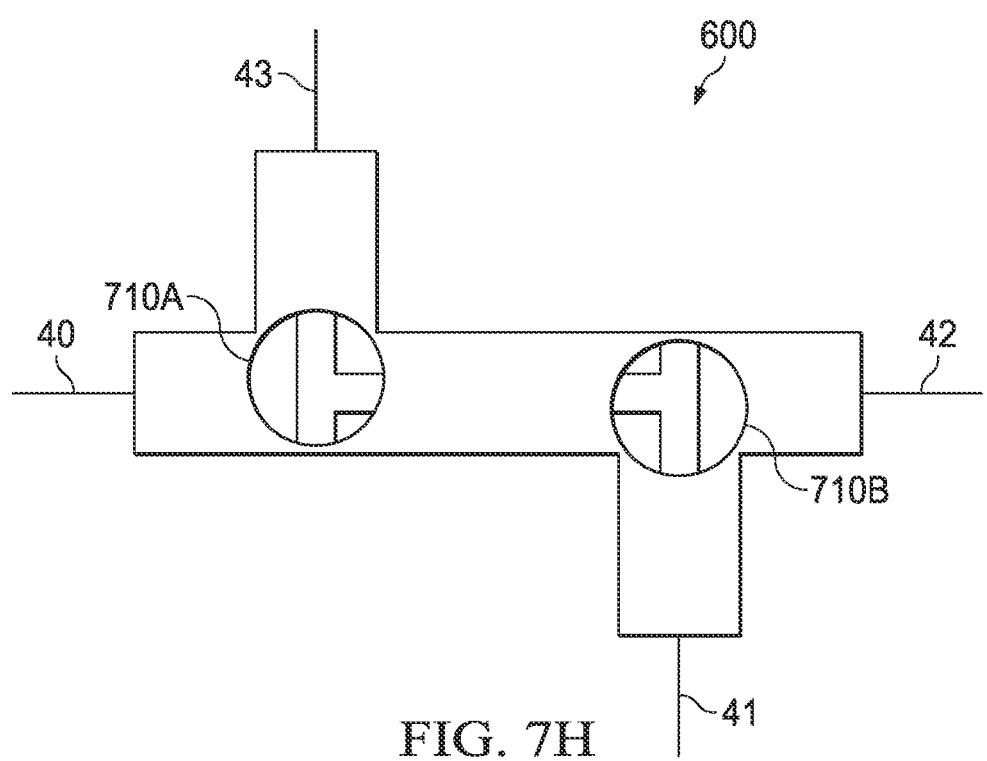

Valve 602 may be implemented using a device that regulates the flow of a fluid by opening or closing passageways. In one example, valve 602 can be a solenoid valve that can be electromechanically operated. An electric current may control the solenoid valve, and the valve positioned to allow or prevent a flow of lubricant as desired. In a particular embodiment, valve 602 may be implemented using a pair of three-way ball valves 710A, 710B, connected as shown in FIGS. 7E-7H. A position of each of the ball valves may be controlled by an associated actuator. In particular, FIG. 7E illustrates positions of ball valves 710A, 710B, when valve 602 is in a test mode (corresponding to FIG. 7A). FIG. 7F illustrates relative positions of ball valves 710A, 710B, in response to a loss of lubricant event in connection with gearbox 410 of lubrication system 510 (corresponding to FIG. 7B). FIG. 7G illustrates relative positions of ball valves 710A, 710B, in response to a loss of lubricant event in connection with gearbox 420 of lubrication system 520 (corresponding to FIG. 7C). FIG. 7H illustrates relative positions of ball valves 710A, 710B, when valve 602 is in an operational mode (corresponding to FIG. 7D).

Figure 8:
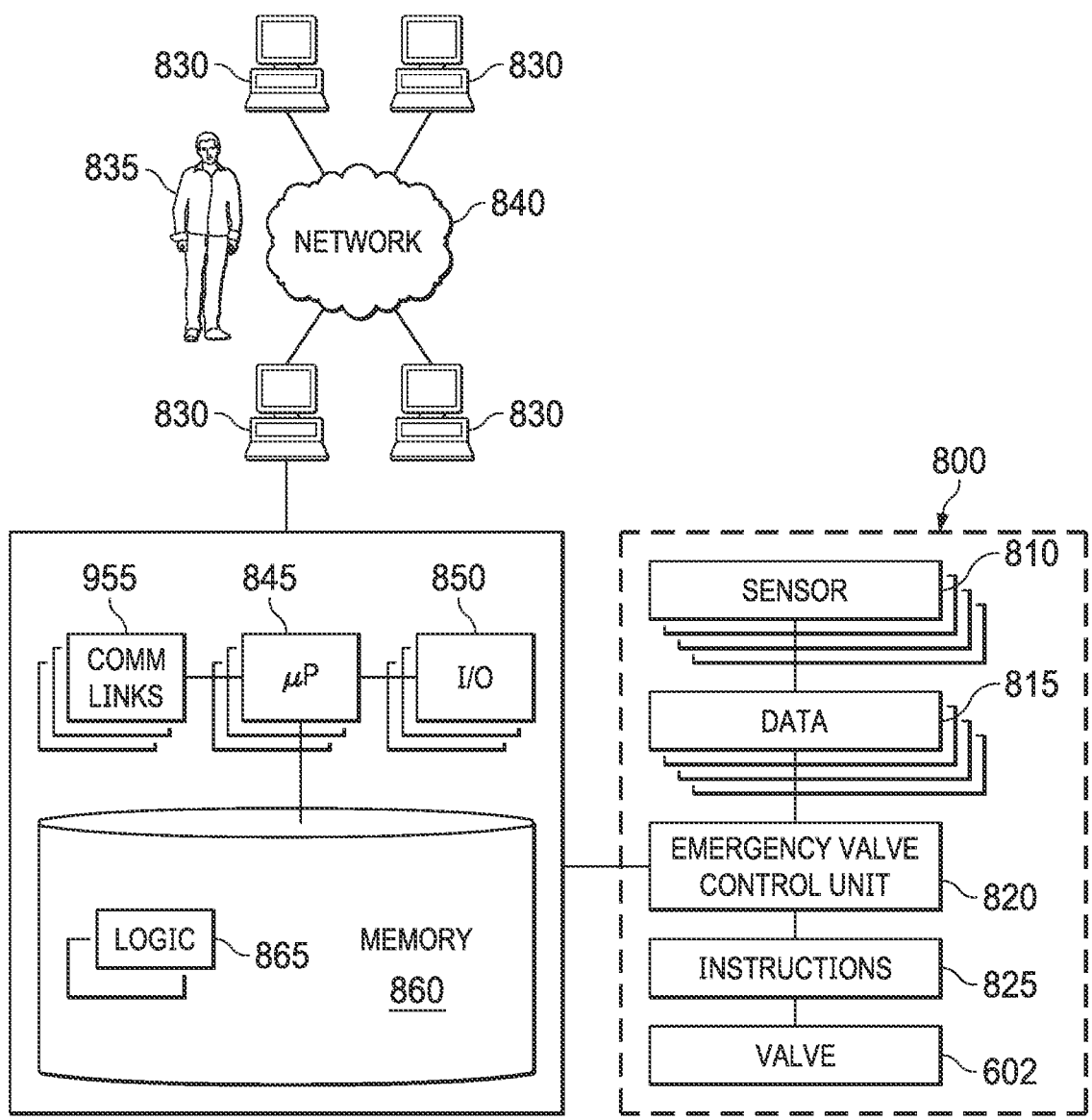
FIG. 8 illustrates a schematic view of a valve control system, according to one example embodiment.

FIG. 8 shows a schematic view of a valve control system 800, according to one example embodiment. Valve control system 800 can include a valve control unit 820 that can be configured to receive data 815 from one or more sensors 810 of aircraft 101. In particular embodiments, sensors may include pressure transducers 604. Valve control unit 820 may also be configured to send instructions 825 to valve 602 for controlling the position of valve 602. Valve control unit 820 may include a computer that is configured to receive data 815; data 815 may include one of more rotorcraft parameters, such as the pressure of lubricant within lubrication system 510 or 520 or the temperature of the lubricant in lubrication system 510 or 520.

Valve control unit 820 send an instruction 825 to valve 602 to move to the position illustrated in FIG. 7A. Data from pressure transducers 604 may be analyzed to verify pressure in lubricant lines 41, 43, and thereby identify potential ruptures and/or leaks in the system.

Valve control unit 820 may analyze data 815 to determine whether a loss of lubricant event has occurred. In one example embodiment, valve control unit 820 may analyze data 815 to determine whether the loss of lubricant event occurred within gearbox assemblies 410 or 420.

During a loss of lubricant event within lubrication system 510, valve control unit 820 may send an instruction 825 to valve 602 to move to the position illustrated in FIG. 7B. During a loss of lubricant event within lubrication system 520, valve control unit 820 may send an instruction 825 to valve 602 to move to the position illustrated in FIG. 7C. During normal operations (i.e., when no loss of lubrication event is detected and the system is not in test mode), the valve control unit 820 may also send an instruction 825 to valve 602 to move to the position illustrated in FIG. 7D.

Teachings of certain embodiments recognize that valve control unit 820 may be implemented by one or more computers 830 communicating across one or more networks 835 and accessible by a user 835. An example of computer system 830 may include, but is not limited to, a flight control computer installed on board an aircraft such as rotorcraft 101. In various embodiments, elements of valve control unit 820 may be installed on board an aircraft, off-board (such as at a ground facility), or a combination of the two. For example, in one embodiment, some elements of valve control unit 820 are installed on board the aircraft whereas other elements of valve control unit 820 are installed off-board such that an onboard computer may include the capability to determine the appropriate instruction 825 during flight as well as the capability to upload/download information to an offboard computer between flights.

Computer system 830 may be used by valve control unit 820 to input the data 815 from one or more sensors 810, determine whether to send an instruction 825 to valve 602 and instruct valve 602 to what position to move. Users 835 may access valve control unit 820 through computer systems 830. Users 835 may include any individual, group of individuals, entity, machine, and/or mechanism that interacts with computer systems 830. Examples of users 835 include, but are not limited to, a pilot, service person, engineer, technician, contractor, agent, and/or employee. Users 835 may be associated with an organization. An organization may include any social arrangement that pursues collective goals. One example of an organization is a business. A business is an organization designed to provide goods or services, or both, to consumers, governmental entities, and/or other businesses.

Computer system 830 may include processors 845, input/output devices 850, communications links 855, and memory 860. In other embodiments, computer system 830 may include more, less, or other components. Computer system 830 may be operable to perform one or more operations of various embodiments. Although the embodiment shown provides one example of computer system 830 that may be used with other embodiments, such other embodiments may utilize computers other than computer system 830. Additionally, embodiments may also employ multiple computer systems 830 or other computers networked together in one or more public and/or private computer networks, such as one or more networks 840.

Processors 845 may include devices operable to execute logic 865 contained within a medium. Examples of processor 845 include one or more microprocessors, one or more applications, and/or other logic. Computer system 830 may include one or multiple processors 845.

Input/output devices 850 may include any device or interface operable to enable communication between computer system 830 and external components, including communication with a user or another system. Example input/output devices 850 may include, but are not limited to, a mouse, keyboard, display, and printer.

Communication links 855 and associated interfaces are operable to facilitate communication between computer system 830 and another element of a network, such as other computer systems 830. Communication links 855 and associated interfaces may connect to any number and combination of wireline and/or wireless networks suitable for data transmission, including transmission of communications. Communication links 855 and associated interfaces may, for example, communicate audio and/or video signals, messages, internet protocol packets, frame relay frames, asynchronous transfer mode cells, and/or other suitable data between network addresses. Communication links 855 and associated interfaces may connect to a computer network or a variety of other communicative platforms including, but not limited to, a public switched telephone network (PSTN); a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable network interfaces; or any combination of the preceding.

Memory 860 may include any suitable storage mechanism and may store any data for use by computer system 830. Memory 860 may comprise one or more tangible, computer-readable, and/or computer-executable storage medium.

Examples of memory 860 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

In some embodiments, memory 860 stores logic 865. Logic 865 facilitates operation of computer system 830. Logic 865 may include hardware, software, and/or other logic. Logic 865 may be encoded in one or more tangible, non-transitory media and may perform operations when executed by a computer. Logic 865 may include a computer program, software, computer executable instructions, and/or instructions capable of being executed by computer system 830. Example logic 865 may include any of the well-known OS2, UNIX, Mac-OS, Linux, and Windows Operating Systems or other operating systems. In particular embodiments, the operations of the embodiments may be performed by one or more computer readable media storing, embodied with, and/or encoded with a computer program and/or having a stored and/or an encoded computer program. Logic 865 may also be embedded within any other suitable medium without departing from the scope of the invention.

Various communications between computers 830 or components of computers 830 may occur across a network, such as network 840. Network 840 may represent any number and combination of wireline and/or wireless networks suitable for data transmission. Network 840 may, for example, communicate internet protocol packets, frame relay frames, asynchronous transfer mode cells, and/or other suitable data between network addresses. Network 840 may include a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable communication links; or any combination of the preceding. Although the illustrated embodiment shows one network 840, teachings of certain embodiments recognize that more or fewer networks may be used and that not all elements may communicate via a network. Teachings of certain embodiments also recognize that communications over a network is one example of a mechanism for communicating between parties, and any suitable mechanism may be used.

Lubrication arrangements and emergency lubrication systems described herein are illustrated in the context of a drive system for tiltrotor aircraft; however, lubrication arrangements and emergency lubrication systems can be implemented on other types of aircraft. For example, an alternative embodiment may include a helicopter that has two or more gearboxes.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: $R=Rl+k*(Ru-Rl)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

The diagrams in the FIGURES illustrate the architecture, functionality, and/or operation of possible implementations of various embodiments of the present disclosure. Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in "one embodiment", "example embodiment", "an embodiment", "another embodiment", "certain embodiments", "some embodiments", "various embodiments", "other embodiments", "alternative embodiment", and the like are intended to mean that any such features are included in one or more embodiments of the present disclosure but may or may not necessarily be combined in the same embodiments.

As used herein, unless expressly stated to the contrary, use of the phrase "at least one of", "one or more of" and "and/or" are open ended expressions that are both conjunctive and disjunctive in operation for any combination of named elements, conditions, or activities. For example, each of the expressions "at least one of X, Y and Z", "at least one of X, Y or Z", "one or more of X, Y and Z", "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first", "second", "third", etc., are intended to distinguish the particular nouns (e.g., blade, rotor, element, device, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of", "one or more of", and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A rotorcraft, comprising:
    a body;
    a rotor blade;
    a drive system operable to rotate the rotor blade, the drive system comprising:
        a first gearbox assembly;
        a second gearbox assembly;
        a lubrication assembly comprising:
            a first lubrication system configured to deliver lubricant to the first gearbox assembly;
            a second lubrication system configured to deliver lubricant to the second gearbox assembly;
            a valve connected between the first and second lubrication systems, wherein when the valve is in a first position, a test mode of operation of the lubrication assembly is enabled and when the valve is in a second position, a normal mode of operation of the lubrication assembly is enabled, wherein the valve comprises a unitary four-position valve; and
            a valve control unit configured to instruct the valve to selectively move between the first position and the second position;
    wherein in the test mode of operation, lubrication is pumped from the first lubrication system through the valve via a first valve passageway and back to the first lubrication system and from the second lubrication system through the valve via a second valve passageway and back to the second lubrication system, the lubrication assembly further comprising sensors for generating pressure data indicative of pressure in the first and second lubrication systems when the lubrication assembly is in the test mode of operation, wherein the valve control unit is further configured to process the pressure data to detect a condition of the first and second lubrication systems and to indicate the detected condition to an operator thereby to enable functional checks to be performed on the lubrication assembly without transfer of lubricant between the first and second lubrication systems;
    wherein the valve control unit is further configured to instruct the valve to move to a third position in which lubricant is permitted to flow from the first lubrication system to the second lubrication system and prevented from flowing from the second lubrication system to the first lubrication system after a loss of lubricant (LOL) event is detected in connection with the second lubrication system; and
    wherein the valve control unit is further configured to instruct the valve to move to a fourth position in which lubricant is permitted to flow from the second lubrication system to the first lubrication system and prevented from flowing from the first lubrication system to the second lubrication system after a loss of lubricant (LOL) event is detected in connection with the first lubrication system.

2. The rotorcraft of claim 1, wherein the first gearbox assembly comprises an interconnect gearbox.

3. The rotorcraft of claim 1, wherein the second gearbox assembly comprises a proprotor gearbox.

4. The rotorcraft of claim 1, wherein the first lubrication system and the second lubrication system are not in fluid communication with each other when the valve is in one of the first and second positions.

5. The rotorcraft of claim 1, wherein when the valve is in the first position, lubricant flows from the first lubrication system through a first passageway in the valve and back to the first lubrication system.

6. The rotorcraft of claim 5, wherein when the valve is in the first position, lubricant flows from the second lubrication system through a second passageway in the valve and back to the second lubrication system.

7. The rotorcraft of claim 1, wherein the first lubrication system includes:
    an incoming lubricant line;
    an outgoing lubricant line; and
    a device for sensing an amount of pressure in connection with the incoming lubricant line.

8. The rotorcraft of claim 1, further comprising:
    a first pressure transducer on an incoming lubricant line of the first lubrication system; and
    a second pressure transducer on an incoming lubricant line of the second lubrication system.

9. The rotorcraft of claim 1, wherein the valve comprises a pair of ball valves disposed within a unitary housing, wherein positions of the ball valves are controlled by an actuator.

10. A drive system comprising:
    a first gearbox assembly;
    a second gearbox assembly;
    a lubrication assembly comprising:
        a first lubrication system configured to deliver lubricant to the first gearbox assembly;

a second lubrication system configured to deliver lubricant to the second gearbox assembly;

a four-position valve comprising a unitary housing connected between the first and second lubrication systems for selectively enabling a flow of lubricant between the first and second lubrication systems and preventing the flow of lubricant between the first and second lubrication systems depending on a position of the four-position valve; and a valve control unit configured to instruct the four-position valve to move to one of a first position, a second position, a third position, and a fourth position;

wherein in the first position, a normal mode of operation of the lubrication assembly is enabled in which lubricant is prevented from flowing through the valve and between the first and second lubrication systems;

wherein in the second position, a test mode of operation of the lubrication assembly is enabled in which lubricant is enabled to flow between the first and second lubrication systems;

wherein in the test mode of operation, lubrication is pumped from the first lubrication system through the valve via a first valve passageway and back to the first lubrication system and from the second lubrication system through the valve via a second valve passageway and back to the second lubrication system, the lubrication assembly further comprising sensors for generating pressure data indicative of pressure in the first and second lubrication systems in the test mode of operation, wherein the valve control unit is further configured to process the pressure data to detect a condition of the first and second lubrication systems and to indicate the detected condition to an operator thereby to enable functional checks to be performed on the lubrication assembly without transfer of lubricant between the first and second lubrication systems;

wherein the valve control unit is configured to instruct the four-position valve to move to the third position in which lubricant is enabled to flow from the first lubrication system to the second lubrication system and prevented from flowing from the second lubrication system to the first lubrication system after a loss of lubricant (LOL) event is detected in connection with the second lubrication system; and wherein the valve control unit is configured to instruct the four-position valve to move to the fourth position in which lubricant is enabled to flow from the second lubrication system to the first lubrication system and prevented from flowing from the first lubrication system to the second lubrication system after an LOL event is detected in connection with the first lubrication system.

11. The drive system of claim 10, wherein when the four-position valve is in the second position, lubricant flows from the first lubrication system through a first passageway in the valve and back to the first lubrication system and lubricant flows from the second lubrication system through a second passageway in the four-position valve and back to the second lubrication system.

12. The drive system of claim 10, wherein the valve control unit instructs the four-position valve to move to the third position after a loss of lubricant (LOL) event is detected in connection with the second lubrication system and wherein in the third position, lubricant flows from the first lubrication system to the second lubrication system through a passageway in the four-position valve.

13. The drive system of claim 10, wherein the valve control unit instructs the four-position valve to move to the fourth position after a loss of lubricant (LOL) event is detected in connection with the first lubrication system and wherein in the fourth position, lubricant flows from the second lubrication system to the first lubrication system through a passageway in the four-position valve.

14. A method of operating a lubrication assembly of a drive system of a rotorcraft, the method comprising:

providing a first lubrication system configured to deliver lubricant to a first gearbox assembly;

providing a second lubrication system configured to deliver lubricant to a second gearbox assembly;

providing a four-position valve comprising a unitary housing between the first and second lubrication systems for selectively enabling a flow of lubricant between the first and second lubrication systems and preventing the flow of lubricant between the first and second lubrication systems depending on a position of the four-position valve; and instructing the four-position valve to enter a selected position, wherein the instructing is performed using signals generated by a valve control unit associated with the four-position valve;

wherein the instructing is performed using signals generated by a valve control unit associated with the four-position valve;

wherein when the four-position valve is in a first position, a test mode of operation of the lubrication assembly is enabled;

wherein when the four-position valve is in a second position, a normal mode of operation of the lubrication assembly is enabled;

wherein in the test mode of operation, the method further comprises:

pumping lubrication between the first and second lubrication systems from the first lubrication system through the valve and back to the first lubrication system and from the second lubrication system through the valve and back to the second lubrication system;

using sensors to generate to the valve control unit pressure data indicative of pressure in the first and second lubrication systems in the test mode of operation; and processing by the valve control unit the pressure data to detect a condition of the first and second lubrication systems and to indicate the detected condition to an operator thereby to enable functional checks to be performed on the lubrication assembly without transfer of lubricant between the first and second lubrication systems;

wherein the valve control unit is configured to instruct the four-position valve to move to a third position in which lubricant flows from the first lubrication system to the second lubrication system and prevented from flowing from the second lubrication system to the first lubrication system after a loss of lubricant (LOL) event is detected in connection with the second lubrication system; and wherein the valve control unit is configured to instruct the four-position valve to move to a fourth position in which lubricant flows from the second lubrication system to the first lubrication system and prevented from flowing from the first lubrication system to the second lubrication system after a loss of lubricant (LOL) event is detected in connection with the first lubrication system.

15. The method of claim 14, wherein:

when the selected position is the second position, lubricant is prevented from flowing between the first and second lubrication systems; and when the selected position is the first position, lubricant flows from the first lubrication system through a first passageway in the four-position valve and back to the first lubrication system and lubricant flows from the second lubrication system through a second passageway in the four-position valve and back to the second lubrication system to enable pressure testing of the first and second lubrication systems.

* * * * *